United States Patent [19]

Raque

[11] Patent Number: 4,490,961

[45] Date of Patent: Jan. 1, 1985

[54] HEAT SEAL METHOD

[76] Inventor: Glenn F. Raque, 11107 Ainwick Ct., Louisville, Ky. 40243

[21] Appl. No.: 337,837

[22] Filed: Jan. 7, 1982

[51] Int. Cl.³ .......................... B65B 7/16; B65B 7/28
[52] U.S. Cl. ...................................... 53/329; 53/373
[58] Field of Search ...................... 53/373, 329, 366; 156/504, 583.8

[56] References Cited

U.S. PATENT DOCUMENTS

| | | | |
|---|---|---|---|
| 3,246,448 | 4/1966 | Amic, Sr. ........................... | 53/373 |
| 3,474,595 | 10/1969 | Moroney et al. ................. | 53/329 X |
| 3,540,186 | 11/1970 | Parvin et al. ..................... | 53/329 X |
| 3,657,055 | 4/1972 | Nichols ............................. | 53/373 X |
| 3,708,954 | 1/1973 | Wilke et al. ........................ | 53/329 |
| 3,712,021 | 1/1973 | Logemann et al. ................. | 53/329 |

Primary Examiner—Horace M. Culver

[57] ABSTRACT

A method and apparatus for sealing covers onto containers carried in apertures in a moving conveyor. The cover is supplied to the top of the containers; a carriage assembly is provided to travel to and fro between first and second carriage positions above the conveyor and includes a press assembly operable from a first position separated from the conveyor and containers to a second position in engagement with the cover material and selected containers to press the cover material onto the containers where the carriage moves from a first carriage position and with the conveyor during the time the press is in the first carriage position in engagement with the container and the press returns to the first position for return of the to the second carriage position.

7 Claims, 7 Drawing Figures

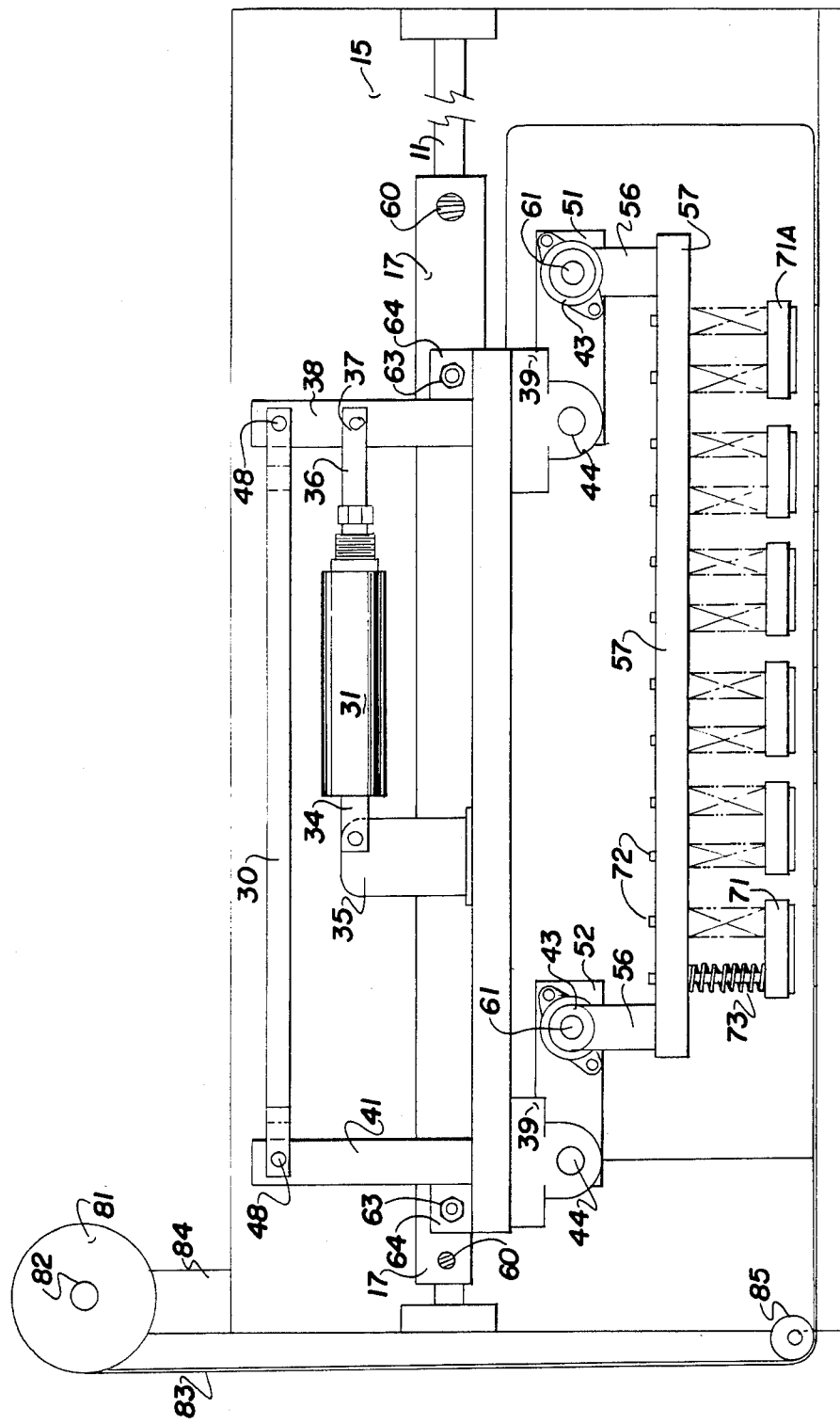

HEAT SEAL METHOD

BACKGROUND OF THE INVENTION

The present invention relates generally to devices to provide a covering for the opening of a container and is particularly useful in the food processing industry where the container is carried on a conveyor, is filled with selected food items, and a cover is then applied to the container.

In such application, including other applications to which the present invention applies the material to be packaged is usually placed in a deep drawn tray, for example an aluminum fiber or plastic tray. The trays usually have a generally transversely extending peripherial flange around a portion of the tray to receive the cover material and in some instances the flange also supports the tray in the conveyor aperture.

In food processing industry applications cleanliness of the operation, ability to cleanse the operating equipment, and minimization of the risk of exposure of the container and product to contaminates are of considerable importance.

Various prior art means are known for providing a cover for containers and for sealing the containers.

One such arrangement is shown in U.S. Pat. No. 4,102,113 where individual covers are supplied to containers traveling on a conveyor line and are mechanically sealed. Other arrangements are shown in U.S. Pat. Nos. 3,268,393 and 2,595,849.

While the foregoing arrangements are satisfactory for applications where the cover is mechanically attached to the device, in other applications a flexible or other type covering is applied, for example, in a web form, and adhered to the containers as they move along the conveying line. Devices heretofor provided for application of web type covers to traveling containers have generally included a drum type seal arrangement but such devices have been limited in speed because of the contact time required to provide an adequate seal for the covering on the container.

No prior art device is known where a carriage travels with containers in a conveyor line to seal the conveyors and permit improved processing speed.

SUMMARY OF THE INVENTION

The present invention provides a economical, straightforward, arrangement for fastening a covering to a container traveling on a conveyor line. Devices within the scope of the present invention are particularly useful in connection with the attachment of a web of covering material to the containers.

Moreover in arrangements within the scope of the present invention a web of covering material can be utilized and fed between the press and the conveyor to prevent the likelihood of admission of any foreign substance to the container during the sealing process.

More particularly, the present invention provides a method and apparatus for sealing covers onto containers carried in apertures in a moving conveyor. The cover is supplied to the top of the containers; a carriage assembly is provided to travel to and fro between first and second carriage positions above the conveyor and includes a press assembly operable from a first position separated from the conveyor and containers to a second position in engagement with the cover material and selected containers to press the cover material onto the containers where the carriage moves from a first position and with the conveyor during the time the press is in the first carriage position in engagement with the container and the press returns to the first position for return of the carriage to the second carriage position.

Various other arrangements also within the scope of the present invention will become obvious to those skilled in the art upon reading the disclosure set forth hereinafter.

BRIEF DESCRIPTION OF THE DRAWINGS

One embodiment in accordance with the present invention is illustrated in the accompanying figures wherein:

FIG. 4 is a view taken along a plane passing through line 4—4 of FIG. 3.

DETAILED DESCRIPTION OF THE DRAWINGS

Figure 1:
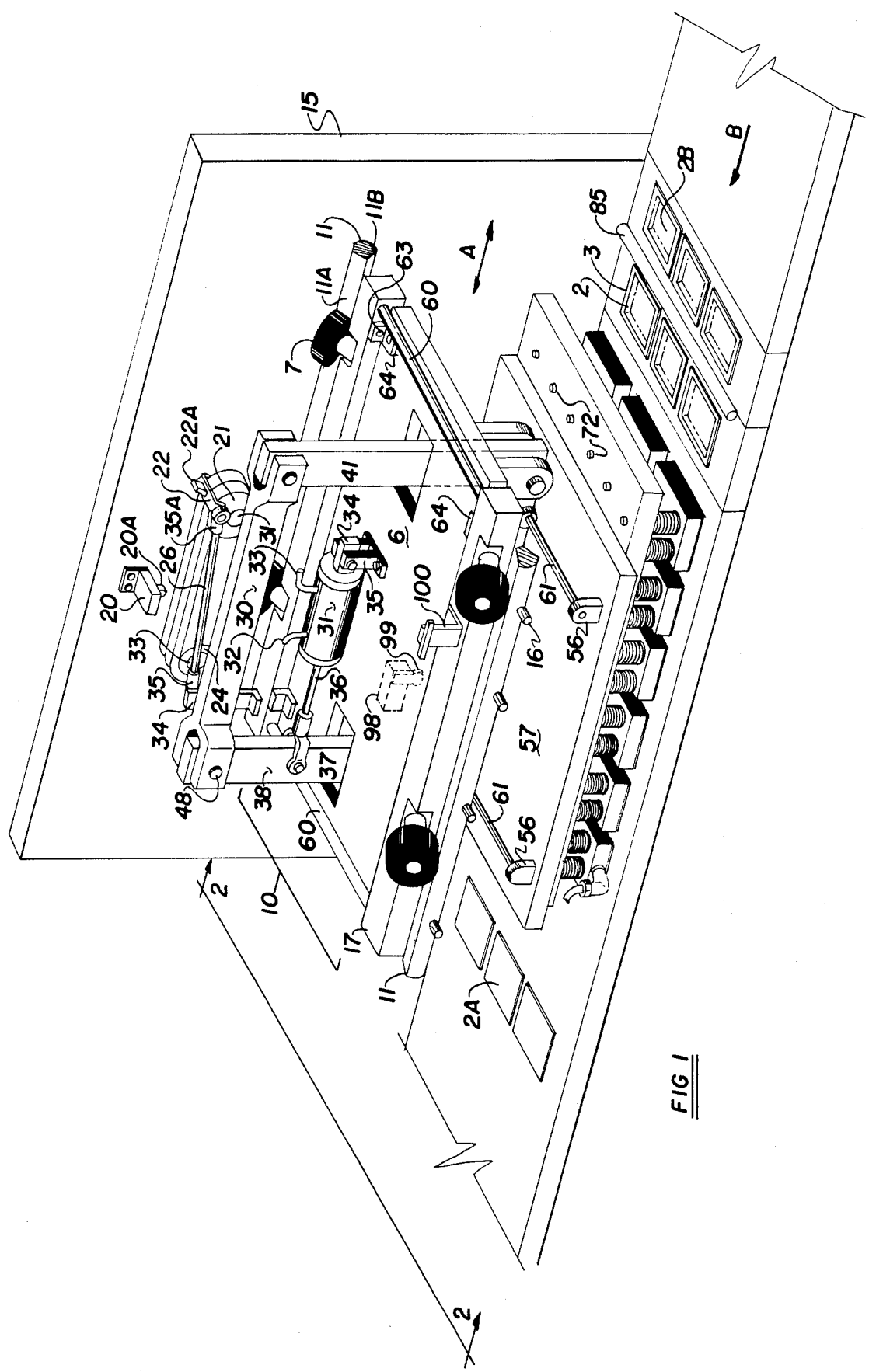
FIG. 1 is a perspective view of a part of a device within the scope of the present invention showing a conveyor and a carriage.

Referring first to FIG. 1 a carriage assembly shown generally by the numeral 10 and described hereinafter, is disposed for oscillating movement as indicated by an arrow A, above a conveyor 1 which is adapted for movement in the direction shown by arrow B. Apertures 2B are provided in conveyor 1 to receive containers 2, as is known in the art where in the example shown each container 2 has a peripherial lip 3 with rests on the surface of conveyor 1 adjacent the apertures. Containers 2 are, typically, supplied to apertures 2B by automatic feed devices well known in the art and not shown in the Figures to prevent unnecessary complications of the drawings.

In the arrangement shown, a device is illustrated to provide a covering for three containers across, though it will be understood that arrangements to provide covering for more or fewer containers are also within the scope of the present invention.

Conveyor 1 moves continuously in the direction shown by arrow B so that, in the example within the scope of the present invention shown, the containers are sequentially positioned under the carriage in groups of, for example eighteen, as described hereinafter. Presses also described hereinafter are carried by carriage 10 and disposed to be aligned with sequential groups of containers to seal the covering means (not shown in FIG. 1 but shown in FIG. 4 and schematically in FIGS. 5A–5C).

As is known in the art, conveyor 1, as shown, can be a segmented conveyor in order to facilitate movement of the conveyor around support means at each end (not shown).

Figure 2:
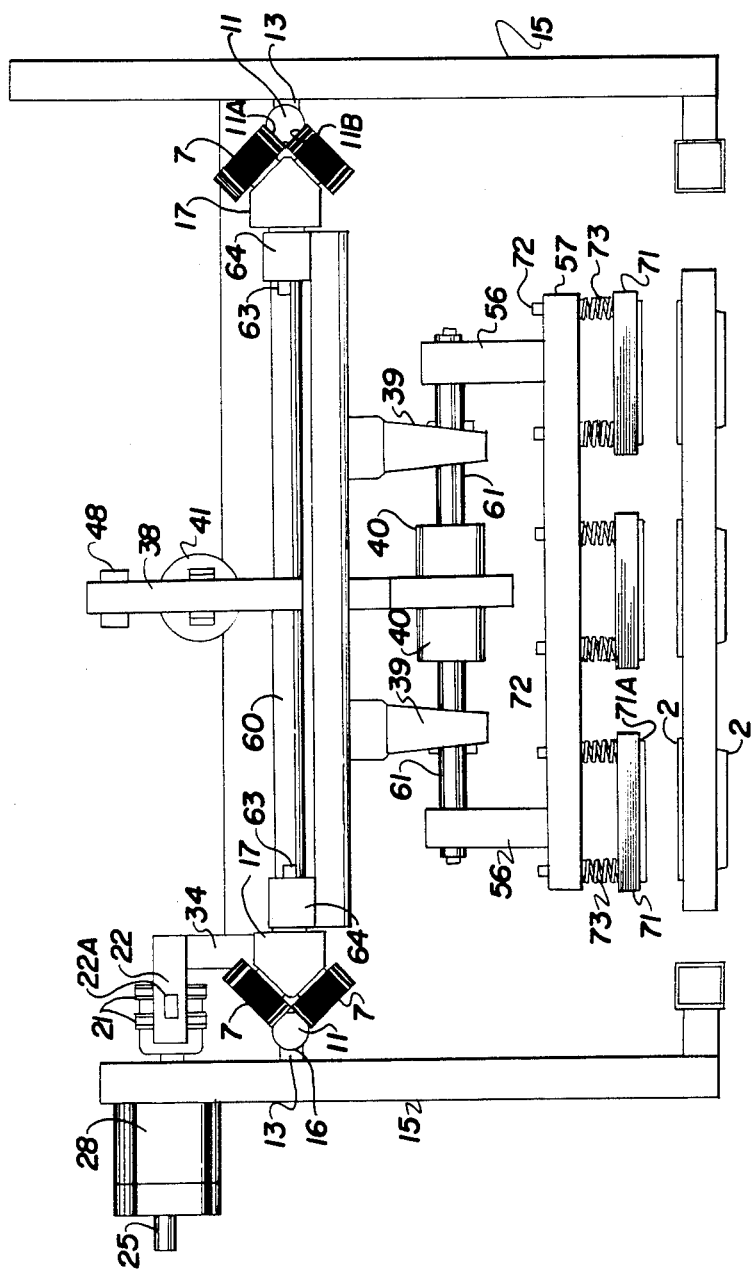
FIG. 2 is a front end view taken along a plane passing through line 2—2 of FIG. 1.
Figure 3:
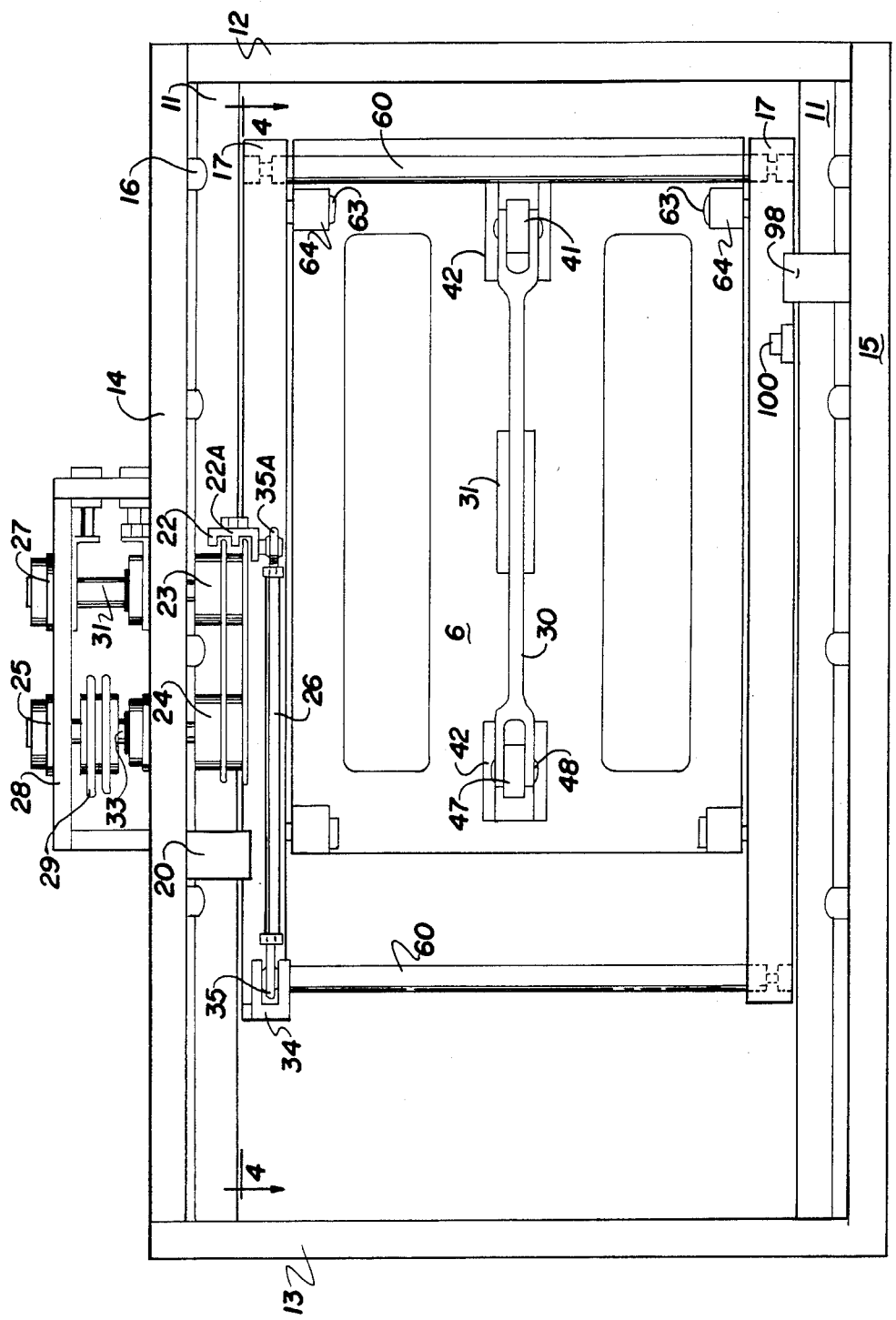
FIG. 3 is a plan view of the device shown in FIG. 1.

Carriage 10 illustrated in FIG. 1 includes a traveling plate 6 supported by means of rollers 7 where it will be seen from FIG. 2 that the rollers 7 are provided on opposite sides of plate 6 and are provided in pairs disposed at selected angle from a pivot block 17 to engage and be supported by a rail 11. Rail 11 includes flat surfaces 11A–11B which engage the periphery of the rollers. It is to be recognized that the arrangement shown in the Figures provides a means for the carriage assembly plate 6 to be supported with respect to both upward forces developed by the process described hereinafter, and downward force developed by the weight of the carriage assembly. As shown in FIG. 3 rails 11 are disposed on each side of traveling plate 6 and are journaled in opposite end walls 12 and 13 of the overall arrangement. Sidewalls 14 and 15 are provided as shown where additional supports 16 extend from the sidewalls 14 and 15 to engage the rails 11 to provide intermediate support. Thus carriage plate 6, carried by wheels 7 can travel to and fro on rails 11 in spaced relation above conveyor 1 from a first position to a second position. Movement of plate 6 and carriage 10 is accomplished by means of endless belts 21, for example chains, which as shown in FIG. 1 pass around spaced sprockets 23 and 24. Endless belts 21 include a drive bracket 22 which is connected for movement with chain 21 and is connected by means of a journal 35A to a connecting rod 26 which is connected to plate 6 by means of a journal 35 and an arm 34.

Sprocket 24 can be a driven sprocket and sprocket 23 at the opposite end can be an idler sprocket. Sprocket 24 is carried on a shaft 33 which is driven by means of a second sprocket 29 which can be driven by the means utilized to drive the conveyor to provide the proper synchronization between the position of the containers 2 and movement of the carriage with presses as described hereinafter. A bracket 28 is provided to carry a journal 25 to journal shaft 33 which carries sprockets 24 and 29 and a shaft 31 which carries idler sprocket 23. Endless belts 21 travel around the sprockets 23 and 24 to drive bracket 22 and connecting rod 26, so that the back and forth motion of plate 6 as illustrated by arrow A is accomplished.

While various support and assembly arrangements and modifications can be provided within the scope of the present invention to provide support for carriage 10 in the example shown, tie rods 60 are provided at opposite ends of plate 6 to be received in pivot blocks 17 to provide spacing a support for the pivot blocks. Brackets 64 are provided by plate 6 and connected to pivot blocks 17 by means of pins 63.

The press assembly carried by plate 6 will now be described with reference to FIGS. 1, 2 and 4.

A double acting cylinder 31 is provided which can be a hydraulic or pneumatic powered, and in the arrangement shown has fluid conduits 32 and 33. Fluid is supplied to cylinder 31 through one of the conduits and exhausted from the other to extend and retract shaft 36 as known in the art where the cylinder as actuated by switches 20 and 99 as described hereinafter. A bracket 34 is provided at the end of cylinder 31 opposite the cylinder shaft 36 and is connected to a bracket 35 which is carried by plate 6. Shaft 36 is connected by means of a clevis 37 to a rocker arm 38 which is pivoted as shown in FIG. 4 by means of a journal arrangement 39 beneath plate 6 and returned by means of a pin 44. A similar arrangement is provided at the opposite end of plate 6 where a rocker arm 41 extends through an aperture 42 in plate 6 and is pivoted in another journal 39 and pins 44 as shown in FIG. 4. The upper ends of rocker arms 38 and 41 are connected by a tie rod 30. Rocker arms 38 and 41 are generally "L" shaped and flange bearings 43 are provided at the ends 51 and 52 respectively of the feet of "L" shaped rocker arms 41 and 38 for connection to a press plate 57 as described hereinafter. Standoff blocks 56 are provided adjacent opposite sides of press plate 57 and shafts 61 are provided to be received in aligned stand off blocks 56 to connect standoff blocks 56 to the rocker arms 38 and 41. Shafts 61 extend across a portion of the width of press plate 57 as shown in FIG. 1 so that press plate 57 is carried on shafts 61 by means of blocks 56.

FIG. 2 also illustrates the arrangement of journal 39, rocker arm 38, end 51 of rocker arm 38, standoffs 56 and shaft 61. A similar arrangement is likewise provided for rocker arm 41 at the opposite end of the device.

Press platens 71, which can include heaters when required for sealing, are provided to extend from press plate 57 and include, as shown pins 72 carried for vertical movement within plate 57. Springs 73 extend from the bottom of plate 57 to the upper surface of the platens 71 to bias the platens away from plate 57.

In the arrangement shown in the Figures three sets of heater platens 71 are provided in six rows so that eighteen containers are closed simultaneously with each cycle of assembly 10 but other arrangements are available within the scope of the present invention.

Operation of the press assembly is illustrated with reference to FIGS. 5A–5C and described hereinafter.

As previously discussed, various means can be provided to supply the covering material to be sealed to containers 2 by platens 71. In one example shown in FIG. 4 a bracket 84 is provided to extend upwardly from wall 15 and carry a pin 82. A roll of covering material 81, is placed on pin 82 where the web 83 is fed under a guide 85 so the web can travel between platens 71 (when press plate 57 is in the up position) and conveyor 1. In operation, containers 2 are carried on conveyor 1, web 83 is secured to the leading containers, and as the containers travel with conveyor 1 web 83 is withdrawn from roll 81 to supply web over containers which are to be sealed in a subsequent sealing operation.

Figure 5A:
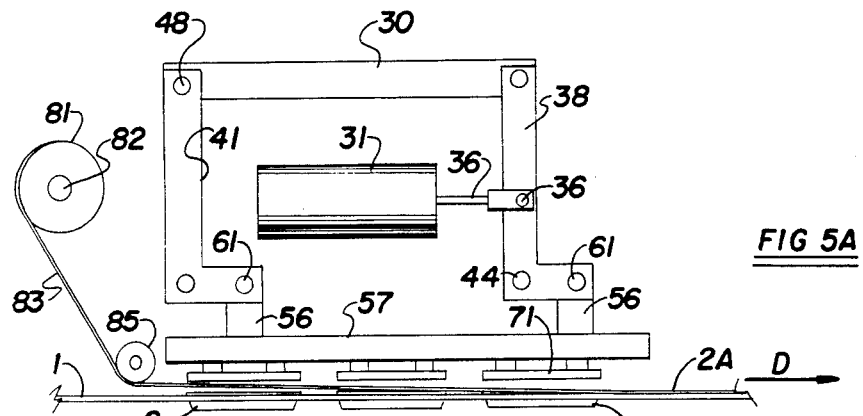
FIGS. 5A–5C illustrate sequentially, operation of the device shown in the Figures.
Figure 5B:
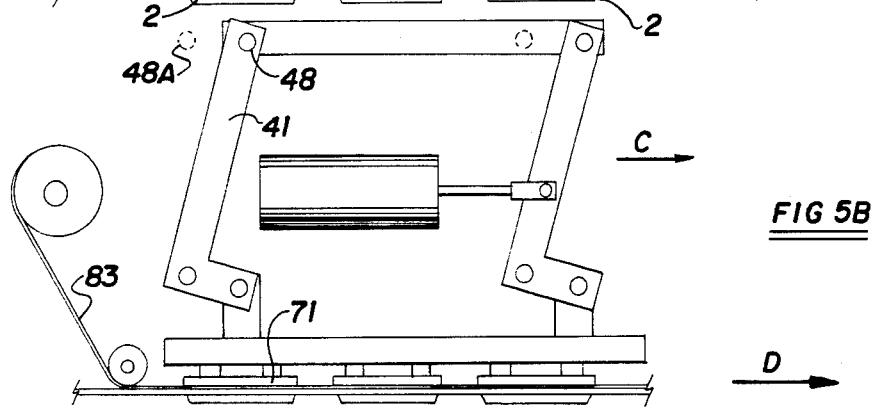
Figure 5C:
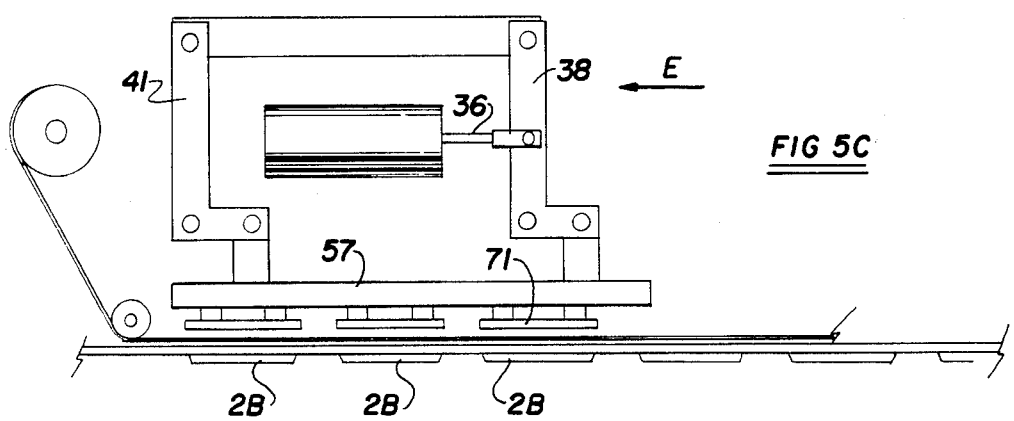

FIGS. 5A–5C illustrate schmatically the operation of a device similar to the device shown and described in the previous Figures.

In FIG. 5A a cylinder 31 is connected to rocker arm 38 by means of clevis 36. Rocker arm 38 is then connected to rocker arm 41 by means of tie rod 30 where rocker arms 38 and 41 are connected to plate 6 (not shown) by means of pins 44 and to stand offs 56 connected to press plate 57 by means of pins 48.

Roll 81 of the covering is shown with web 83 extending downwardly under guide 85 and through the space between platens 71 and containers carried on conveyor 1. It will also be noted that a containers 2A with the web covering seal thereto is shown to illustrate the method by which the web is withdrawn from roll 81. It will be further recognized that at some point subsequent to the arrangement shown in FIG. 5A the web is cut to separate containers 2A.

In the arrangement shown in FIG. 5A a sealing operation has been completed as illustrated by the position of container 2A with the web sealed thereto and a second sealing sequence is to commence. Initially, an again with reference to FIG. 1 a tab 22A is provided on bracket 22 to engage a lever 20A of, for example a limit switch 20 to initiate operation of cylinder 31. It will also be noted in FIG. 1 that a second limit switch 98 is provided having a activating arm 99 to be enaged by bracket 100 carried by a pivot block 17 so that cylinder operation is reversed as described hereinafter. In FIG. 5B the operation of cylinder 31 is commenced so that shaft 36 has been withdrawn to pivot rocker arms 38 and 41 so that, for example pivots 48 have advanced from the postion shown as numeral 48A to the position shown as numeral 48. This results in movement of the lower portion of the rocker arm so that press plate 57 is urged downwardly so platens 71 urge web 83 into engagement with containers 2 disposed beneath the press plate. It will be noted that, as shown by arrow C in this position the carriage assembly is traveling in the direction of movement of the conveyor as shown by arrow D. The carriage assembly travels with conveyor 1 for a selected distance determined by the separation between the sprockets 23 and 24 and at the end of the cycle cylinder 31 is actuated, for example, where contact 100 engages lever arm 99 to reverse operation of cylinder 31 as shown in FIG. 5C where shaft 36 has been retracted to return rocker arms 41 and 38 to the original position. As shown by arrow E carriage assembly 10 is then returned to the original position as shown in FIG. 5A with the platens 71 and press plate 57 in the up position for recycling after a new set of containers 2B have been positioned under the carriage assembly.

The invention claimed is:

1. An apparatus for supplying and sealing a cover means to containers carried in a selected direction on a moving conveyor including a carriage assembly means located above the conveyor for movement parallel to the direction of movement of the conveyor and adapted to move in the direction of movement of the conveyor from a first position above said conveyor means at the same rate of speed as said conveyor means for a selected distance to a second position, return means to return said carriage means from said second carriage position to said first carriage position; press means carried by said carriage means including rocker arm means and pivotably connected thereto, platen means connected for movement toward and away from said conveyor means by said rocker arm means; motive means to selectively pivot said rocker arm means about said pivot means whereby said platen means is extended from said first position above said conveyor means to said second position engaging said container means carried by said conveyor means; control means to actuate said platen means from said first position to said second position when said carriage means is in said first carriage position and to move said platen means from said second to said first postion when said carriage means is in said second carriage position.

2. The invention of claim 1 wherein said rocker arm means include first and second rocker arm means pivotably carried by said carriage means and located in spaced relation and tie rod means to connect said rocker arm means for simultaneous coordinated movement of said rocker arm means.

3. The invention of claim 1 including carriage drive means including driven sprocket means and idler sprocket means disposed in spaced relation to receive endless belt means to connect said endless belt means and said carriage means to move said carriage means between said first and second carriage positions with rotation of said driven and idler sprockets.

4. The invention of claim 3 wherein said driven sprocket is driven by power source means which move said conveyor to provide timing coordination between said conveyor means and said carriage means whereby said carriage means moves from said first carriage position to said second carriage postion at the same speed as the speed of movement of said conveyor means.

5. The invention of claim 1 including web supply means to supply a continuous web of covering material between said platen means and said conveyor means.

6. The invention of claim 3 including switch means to actuate said control means and having actuator lever means to actuate said control means to move said platen means between said first and second position wherein said endless belt carries arm means to engage said actuator lever means to actuate said control means.

7. The invention of claim 6 wherein said carriage means includes arm means to engage said actuator lever means.

* * * * *